(12) United States Patent
Choi et al.

(10) Patent No.: US 9,243,620 B2
(45) Date of Patent: Jan. 26, 2016

(54) APPARATUS FOR CONTROLLING A LINEAR COMPRESSOR

(75) Inventors: Bong-Jun Choi, Changwon-Shi (KR); Chang-Yong Jang, Gwangju (KR); Man-Seok Cho, Geoje-Shi (KR); Shin-Hyun Park, Busan (KR); Hyun Kim, Changwon-Shi (KR); Jong-Min Shin, Busan (KR); Young-Hoan Jeon, Changwon-Shi (KR); Chul-Gi Roh, Changwon-Shi (KR)

(73) Assignee: LG Electronics Inc., Seoul (KR)

( * ) Notice: Subject to any disclaimer, the term of this patent is extended or adjusted under 35 U.S.C. 154(b) by 1421 days.

(21) Appl. No.: 11/660,759

(22) PCT Filed: Aug. 30, 2004

(86) PCT No.: PCT/KR2004/002179
§ 371 (c)(1),
(2), (4) Date: Oct. 17, 2008

(87) PCT Pub. No.: WO2006/025619
PCT Pub. Date: Mar. 9, 2006

(65) Prior Publication Data
US 2009/0047154 A1      Feb. 19, 2009

(51) Int. Cl.
F25B 49/00   (2006.01)
F04B 35/04   (2006.01)
H02K 33/16   (2006.01)

(52) U.S. Cl.
CPC ............... *F04B 35/045* (2013.01); *H02K 33/16* (2013.01); *F04B 2201/0206* (2013.01); *F04B 2201/0806* (2013.01); *F04B 2203/0402* (2013.01); *F04B 2207/045* (2013.01)

(58) Field of Classification Search
CPC ........... F04B 35/045; F04B 2201/0206; F04B 2201/0806; F04B 2203/0402; F04B 2207/045; H02K 33/16

USPC .......... 62/215, 226, 228.1, 228.3, 230; 92/12, 92/13
See application file for complete search history.

(56) References Cited

U.S. PATENT DOCUMENTS 4,067,667 A * 1/1978 White ........................... 417/418
4,345,442 A * 8/1982 Dorman ......................... 62/160
(Continued)

FOREIGN PATENT DOCUMENTS

BR     9703097 A     9/1998
EP     0 952 347 A1  10/1999
(Continued)

*Primary Examiner* — Marc Norman
*Assistant Examiner* — Paolo Gonzalez
(74) *Attorney, Agent, or Firm* — Birch, Stewart, Kolasch & Birch, LLP

(57) ABSTRACT

The present invention discloses a linear compressor which can rapidly overcome load and improve compression efficiency, by synchronizing an operation frequency of a linear motor with a natural frequency of a movable member varied by the load and varying a stroke of the movable member according to the load. The linear compressor includes a fixed member having a compression space inside, a movable member linearly reciprocated in the fixed member in the axial direction, for compressing refrigerants sucked into the compression space, one or more springs installed to elastically support the movable member in the motion direction of the movable member, spring constants of which being varied by load, and a linear motor installed to be connected to the movable member, for linearly reciprocating the movable member in the axial direction, and varying a stroke of the movable member according to a predetermined refrigeration force, so that the movable member can be linearly reciprocated to reach a top dead center.

4 Claims, 12 Drawing Sheets

(56) References Cited

U.S. PATENT DOCUMENTS

| | | | | |
|---|---|---|---|---|
| 4,353,220 A * | 10/1982 | Curwen et al. | | 62/228.1 |
| 4,474,537 A * | 10/1984 | Dolz | | 417/44.1 |
| 5,106,267 A * | 4/1992 | Kawamura et al. | | 417/45 |
| 5,897,296 A * | 4/1999 | Yamamoto et al. | | 417/44.1 |
| 5,947,693 A | 9/1999 | Yang | | |
| 5,980,211 A * | 11/1999 | Tojo et al. | | 417/45 |
| 6,520,746 B2 * | 2/2003 | Yoo et al. | | 417/44.11 |
| 6,616,414 B2 * | 9/2003 | Yoo et al. | | 417/44.1 |
| 6,685,438 B2 | 2/2004 | Yoo et al. | | |
| 6,746,211 B2 * | 6/2004 | Kwon et al. | | 417/44.11 |
| 6,832,898 B2 * | 12/2004 | Yoshida et al. | | 417/44.11 |
| 6,851,934 B2 * | 2/2005 | Yoo et al. | | 417/44.11 |
| 6,960,893 B2 | 11/2005 | Yoshida et al. | | |
| 6,977,474 B2 * | 12/2005 | Ueda et al. | | 318/128 |
| 7,151,348 B1 * | 12/2006 | Ueda et al. | | 318/114 |
| 7,335,001 B2 * | 2/2008 | Lee et al. | | 417/44.11 |
| 7,341,432 B2 * | 3/2008 | Sung et al. | | 417/44.1 |
| 7,408,310 B2 * | 8/2008 | Hong et al. | | 318/119 |
| 7,550,941 B2 * | 6/2009 | Dainez et al. | | 318/608 |
| 2002/0051710 A1 * | 5/2002 | Yoo et al. | | 417/44.11 |
| 2002/0090304 A1 * | 7/2002 | Yoo et al. | | 417/44.1 |
| 2003/0021693 A1 * | 1/2003 | Schwarz et al. | | 417/12 |
| 2003/0026702 A1 * | 2/2003 | Yoo et al. | | 417/44.11 |
| 2003/0026703 A1 | 2/2003 | Yoo et al. | | |
| 2003/0099550 A1 * | 5/2003 | Kim | | 417/44.11 |
| 2003/0108430 A1 * | 6/2003 | Yoshida et al. | | 417/44.11 |
| 2003/0129063 A1 * | 7/2003 | Jeun | | 417/45 |
| 2003/0161734 A1 * | 8/2003 | Kim | | 417/44.1 |
| 2003/0161735 A1 * | 8/2003 | Kim et al. | | 417/44.1 |
| 2003/0164691 A1 * | 9/2003 | Ueda et al. | | 318/135 |
| 2003/0175125 A1 * | 9/2003 | Kwon et al. | | 417/44.11 |
| 2004/0005222 A1 | 1/2004 | Yoshida et al. | | |
| 2004/0071556 A1 * | 4/2004 | Sung et al. | | 417/44.1 |
| 2004/0101413 A1 * | 5/2004 | Inagaki et al. | | 417/44.11 |
| 2004/0169480 A1 * | 9/2004 | Ueda et al. | | 318/114 |
| 2004/0183487 A1 * | 9/2004 | Ueda et al. | | 318/114 |
| 2004/0239266 A1 * | 12/2004 | Lee et al. | | 318/119 |
| 2004/0245862 A1 * | 12/2004 | Hong et al. | | 310/12 |
| 2006/0171814 A1 * | 8/2006 | Dainez et al. | | 417/44.1 |
| 2006/0228224 A1 * | 10/2006 | Hong et al. | | 417/44.1 |

FOREIGN PATENT DOCUMENTS

| | | | | |
|---|---|---|---|---|
| JP | 9-195938 A | 7/1997 | | |
| JP | 9-195949 A | 7/1997 | | |
| JP | 11-132585 A | 5/1999 | | |
| JP | 2001-73944 A | 3/2001 | | |
| JP | 2001-082326 A | 3/2001 | | |
| JP | 2002-44977 A | 2/2002 | | |
| JP | 2002-122080 A | 4/2002 | | |
| JP | 2002-317761 A | 10/2002 | | |
| KR | 2001-0057481 A | 7/2001 | | |
| WO | WO 2004008626 A1 * | 1/2004 | | H02P 7/00 |
| WO | WO 2004063569 A1 * | 7/2004 | | F04B 35/04 |

* cited by examiner

APPARATUS FOR CONTROLLING A LINEAR COMPRESSOR

TECHNICAL FIELD

The present invention relates to a linear compressor which can rapidly overcome load and improve compression efficiency, by simultaneously/individually synchronizing an operation frequency of a linear motor with a natural frequency of a movable member varied by the load and varying a stroke of the movable member according to the load.

BACKGROUND ART

In general, a compressor that is a mechanical apparatus for increasing a pressure, by receiving power from a power unit system such as an electric motor or turbine and compressing air, refrigerants or other various operation gases has been widely used for home appliances such as a refrigerator and an air conditioner or in the whole industrial fields.

The compressors are roughly divided into a reciprocating compressor having a compression space through which operation gases are sucked or discharged between a piston and a cylinder, so that the piston can be linearly reciprocated inside the cylinder to compress refrigerants, a rotary compressor having a compression space through which operation gases are sucked or discharged between an eccentrically-rotated roller and a cylinder, so that the roller can be eccentrically rotated on the inner walls of the cylinder to compress refrigerants, and a scroll compressor having a compression space through which operation gases are sucked or discharged between an orbiting scroll and a fixed scroll, so that the orbiting scroll can be rotated with the fixed scroll to compress refrigerants.

Recently, among the reciprocating compressors, a linear compressor has been mass-produced because it has high compression efficiency and simple structure by removing mechanical loss by motion conversion by directly connecting a piston to a driving motor performing linear reciprocation.

Generally, the linear compressor which sucks, compresses and discharges refrigerants by using a linear driving force of the motor includes a compression unit consisting of a cylinder and a piston for compressing refrigerant gases, and a driving unit consisting of a linear motor for supplying a driving force to the compression unit.

In detail, in the linear compressor, the cylinder is fixedly installed in a closed vessel, and the piston is installed in the cylinder to perform linear reciprocation. When the piston is linearly reciprocated inside the cylinder, refrigerants are sucked into a compression space in the cylinder, compressed and discharged. A suction valve assembly and a discharge valve assembly are installed in the compression space, for controlling suction and discharge of the refrigerants according to the inside pressure of the compression space.

In addition, the linear motor for generating a linear motion force to the piston is installed to be connected to the piston. An inner stator and an outer stator formed by stacking a plurality of laminations at the periphery of the cylinder in the circumferential direction are installed on the linear motor with a predetermined gap. A coil is coiled inside the inner stator or the outer stator, and a permanent magnet is installed at the gap between the inner stator and the outer stator to be connected to the piston.

Here, the permanent magnet is installed to be movable in the motion direction of the piston, and linearly reciprocated in the motion direction of the piston by an electromagnetic force generated when a current flows through the coil. Normally, the linear motor is operated at a constant operation frequency $f_c$, and the piston is linearly reciprocated by a predetermined stroke S.

On the other hand, various springs are installed to elastically support the piston in the motion direction even though the piston is linearly reciprocated by the linear motor. In detail, a coil spring which is a kind of mechanical spring is installed to be elastically supported by the closed vessel and the cylinder in the motion direction of the piston. Also, the refrigerants sucked into the compression space serve as a gas spring.

The coil spring has a constant mechanical spring constant $K_m$, and the gas spring has a gas spring constant $K_g$ varied by load. A natural frequency $f_n$ of the piston (or linear compressor) is calculated in consideration of the mechanical spring constant $K_m$ and the gas spring constant $K_g$.

The thusly-calculated natural frequency $f_n$ of the piston determines the operation frequency $f_c$ of the linear motor. The linear motor improves efficiency by equalizing its operation frequency $f_c$ to the natural frequency $f_n$ of the piston, namely, operating in the resonance state.

Accordingly, in the linear compressor, when a current is applied to the linear motor, the current flows through the coil to generate an electromagnetic force by interactions with the outer stator and the inner stator, and the permanent magnet and the piston connected to the permanent magnet are linearly reciprocated by the electromagnetic force.

Here, the linear motor is operated at the constant operation frequency $f_c$. The operation frequency $f_c$ of the linear motor is equalized to the natural frequency $f_n$ of the piston, so that the linear motor can be operated in the resonance state to maximize efficiency.

As described above, when the piston is linearly reciprocated inside the cylinder, the inside pressure of the compression space is changed. The refrigerants are sucked into the compression space, compressed and discharged according to changes of the inside pressure of the compression space.

The linear compressor is formed to be operated at the operation frequency $f_c$ identical to the natural frequency $f_n$ of the piston calculated by the mechanical spring constant $K_m$ of the coil spring and the gas spring constant $K_g$ of the gas spring under the load considered in the linear motor at the time of design. Therefore, the linear motor is operated in the resonance state merely under the load considered on design, to improve efficiency.

However, since the actual load of the linear compressor is varied, the gas spring constant $K_g$ of the gas spring and the natural frequency $f_n$ of the piston calculated by the gas spring constant $K_g$ are changed.

In detail, as illustrated in FIG. 1A, the operation frequency $f_c$ of the linear motor is determined to be identical to the natural frequency $f_n$ of the piston in a middle load area at the time of design. Even if the load is varied, the linear motor is operated at the constant operation frequency $f_c$. But, as the load increases, the natural frequency $f_n$ of the piston increases.

$$f_n = \frac{1}{2\pi}\sqrt{\frac{K_m + K_g}{M}} \quad \text{Formula 1}$$

Here, $f_n$ represents the natural frequency of the piston, $K_m$ and $K_g$ represent the mechanical spring constant and the gas spring constant, respectively, and M represents a mass of the piston.

Generally, since the gas spring constant $K_g$ has a small ratio in the total spring constant $K_t$, the gas spring constant $K_g$ is ignored or set to be a constant value. The mass M of the piston and the mechanical spring constant $K_m$ are also set to be constant values. Therefore, the natural frequency $f_n$ of the piston is calculated as a constant value by the above Formula 1.

However, the more the actual load increases, the more the pressure and temperature of the refrigerants in the restricted space increase. Accordingly, an elastic force of the gas spring itself increases, to increase the gas spring constant $K_g$. Also, the natural frequency $f_n$ of the piston calculated in proportion to the gas spring constant $K_g$ increases.

Referring to FIGS. 1A and 1B, the operation frequency $f_c$ of the linear motor and the natural frequency $f_n$ of the piston are identical in the middle load area, so that the piston can be operated to reach a top dead center (TDC), thereby stably performing compression. In addition, the linear motor is operated in the resonance state, to maximize efficiency of the linear compressor.

However, the natural frequency $f_n$ of the piston gets smaller than the operation frequency $f_c$ of the linear motor in a low load area, and thus the piston is transferred over the TDC, to apply an excessive compression force. Moreover, the piston and the cylinder are abraded by friction. Since the linear motor is not operated in the resonance state, efficiency of the linear compressor is reduced.

In addition, the natural frequency $f_n$ of the piston becomes larger than the operation frequency $f_c$ of the linear motor in a high load area, and thus the piston does not reach the TDC, to reduce the compression force. The linear motor is not operated in the resonance state, thereby decreasing efficiency of the linear compressor.

As a result, in the conventional linear compressor, when the load is varied, the natural frequency $f_n$ of the piston is varied, but the operation frequency $f_c$ of the linear motor is constant. Therefore, the linear motor is not operated in the resonance state, which results in low efficiency. Furthermore, the linear compressor cannot actively handle and rapidly overcome the load.

On the other hand, in order to rapidly overcome the load, as shown in FIGS. 2A and 2B, the conventional linear compressor allows the piston 6 to be operated inside the cylinder 4 in a high or low refrigeration mode by adjusting an amount of voltage (or current) applied to the linear motor. The stroke S of the piston 6 is varied according to the operation modes, to change a compression capacity.

As illustrated in FIG. 2A, a voltage V1 is used for the high refrigeration mode and a voltage V2 is used for the low refrigeration mode. When the voltages V1 and V2 have positive values from a null point (0), the piston 6 performs compression, and when the voltages V1 and V2 have negative values, the piston 6 performs suction. Here, peak values of the voltages V1 and V2 must be smaller than the maximum voltage threshold value $V_p$ outputted from the linear compressor.

Since peak-peak values of the voltages V1 and V2 decide the stroke S of the piston 6, the stroke S of the piston 6 is controlled by changing the peak-peak values. In the high refrigeration mode, the peak-peak value of the voltage V1 is equal to the peak-peak value $2V_p$ according to the maximum voltage threshold value $V_p$, and thus the piston 6 reaches the TDC (high refrigeration mode stroke S1). In the low refrigeration mode, the peak-peak value of the voltage V2 is reduced, and thus the piston 6 is linearly reciprocated not to reach the TDC.

The linear compressor is operated in the high refrigeration mode in a state where the load is relatively large. In the high refrigeration mode, the operation frequency $f_c$ of the linear motor is equalized to the natural frequency $f_n$ of the piston 6, so that the piston 6 can be operated to reach the TDC with a predetermined stroke S1.

In addition, the linear compressor is operated in the low refrigeration mode in a state where the load is relatively small. In the low refrigeration mode, the compression capacity can be reduced by decreasing the voltage applied to the linear motor. However, in a state where the piston 6 is elastically supported in the motion direction by the elastic force of the mechanical spring and the gas spring, a stroke S2 of the piston 6 is reduced. Accordingly, the piston 6 cannot reach the TDC. Moreover, the operation frequency $f_c$ is different from the varied natural frequency $f_n$ of the piston 6, which results in low efficiency and compression force of the linear compressor.

DISCLOSURE OF THE INVENTION

The present invention is achieved to solve the above problems. An object of the present invention is to provide a linear compressor which can efficiently vary a compression capacity according to load, by controlling an operation frequency of a linear motor and/or a stroke of a piston, even if a natural frequency of the piston is varied by the load.

Another object of the present invention is to provide a linear compressor which can attain maximum efficiency, by varying a stroke of a piston and linearly reciprocating the piston to reach a top dead center at the same time.

In order to achieve the above-described object of the invention, there is provided a linear compressor, including: a fixed member having a compression space inside; a movable member linearly reciprocated in the fixed member in the axial direction, for compressing refrigerants sucked into the compression space; one or more springs installed to elastically support the movable member in the motion direction of the movable member, spring constants of which being varied by load; and a linear motor installed to be connected to the movable member, for linearly reciprocating the movable member in the axial direction, and varying a stroke of the movable member according to a predetermined refrigeration force, so that the movable member can be linearly reciprocated to reach a top dead center.

Preferably, the linear compressor is installed in a refrigeration/air conditioning cycle, and the load is calculated in proportion to a difference between a pressure of condensing refrigerants in the refrigeration/air conditioning cycle (condensing pressure) and a pressure of evaporating refrigerants in an evaporator (evaporating pressure).

Preferably, the load is additionally calculated in proportion to a pressure that is an average of the condensing pressure and the evaporating pressure (average pressure).

Preferably, the linear motor synchronizes its operation frequency with a resonance frequency of the movable member varied in proportion to the load.

Preferably, the linear motor includes: an inner stator formed by stacking a plurality of laminations in the circumferential direction to cover the periphery of the fixed member; an outer stator disposed outside the inner stator at a predetermined interval, and formed by stacking a plurality of laminations in the circumferential direction; a coil wound body for generating an electromagnetic force between the inner stator and the outer stator; and a permanent magnet positioned at the gap between the inner stator and the outer stator, connected to the movable member, and linearly reciprocated by interactions with the electromagnetic force of the coil wound body. Preferably, the linear motor includes: a power source unit for applying a direct current voltage by rectifying an external alternating current voltage; an inverter unit for receiving the direct current voltage from the power source unit, generating an alternating current voltage according to a predetermined inverter control signal, and applying the alternating current voltage to the coil wound body; and a control unit for setting a variable quantity of the stroke of the movable member according to the refrigeration force, generating the inverter control signal for generating the unsymmetrical alternating current voltage according to the variable quantity, and applying the inverter control signal to the inverter unit.

Preferably, a positive peak value of the unsymmetrical alternating current voltage is identical to that of a maximum voltage threshold value of the inverter unit.

Preferably, the unsymmetrical alternating current voltage is unsymmetrical from a null point.

Preferably, the unsymmetrical alternating current voltage is symmetrical to a predetermined offset voltage.

Preferably, when the unsymmetrical alternating current voltage is higher than the offset voltage, the movable member performs compression, and when the unsymmetrical alternating current voltage is lower than the offset voltage, the movable member performs suction.

Preferably, the control unit varies the stroke of the movable member by varying a peak-peak value of the unsymmetrical alternating current voltage.

Preferably, when the refrigeration force is low, the peak-peak value of the unsymmetrical alternating current voltage is smaller than the peak-peak value according to the maximum voltage threshold value of the inverter unit.

Preferably, the offset voltage has a positive value.

Preferably, when the refrigeration force is high, the peak-peak value of the unsymmetrical alternating current voltage is larger than the peak-peak value according to the maximum voltage threshold value of the inverter unit.

Preferably, the offset voltage has a negative value.

Preferably, a negative peak value of the unsymmetrical alternating current voltage is varied according to the variable quantity.

Preferably, when the unsymmetrical alternating current voltage is higher than the null point, the movable member performs compression, and when the unsymmetrical alternating current voltage is lower than the null point, the movable member performs suction.

Preferably, when the refrigeration force is low, the negative peak value of the unsymmetrical alternating current voltage is smaller than the positive peak value in proportion to the variable quantity, and when the refrigeration force is high, the negative peak value of the unsymmetrical alternating current voltage is larger than the positive peak value in proportion to the variable quantity.

According to another aspect of the present invention, an apparatus for controlling a linear compressor includes: a power source unit for applying a direct current voltage by rectifying an external alternating current voltage; an inverter unit for receiving the direct current voltage from the power source unit, generating an alternating current voltage according to a predetermined inverter control signal, and applying the alternating current voltage to a coil wound body; and a control unit for setting a variable quantity of a stroke of a movable member of the linear compressor according to a refrigeration force, generating the inverter control signal for generating the unsymmetrical alternating current voltage according to the variable quantity, and applying the inverter control signal to the inverter unit.

According to yet another aspect of the present invention, a method for controlling a linear compressor includes the steps of: setting a unsymmetrical alternating current voltage on the basis of a variable quantity of a stroke of a movable member of the linear compressor according to a refrigeration force; and generating an inverter control signal for generating the unsymmetrical alternating current voltage.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A linear compressor in accordance with preferred embodiments of the present invention will now be described in detail with reference to the accompanying drawings.

Figure 3:
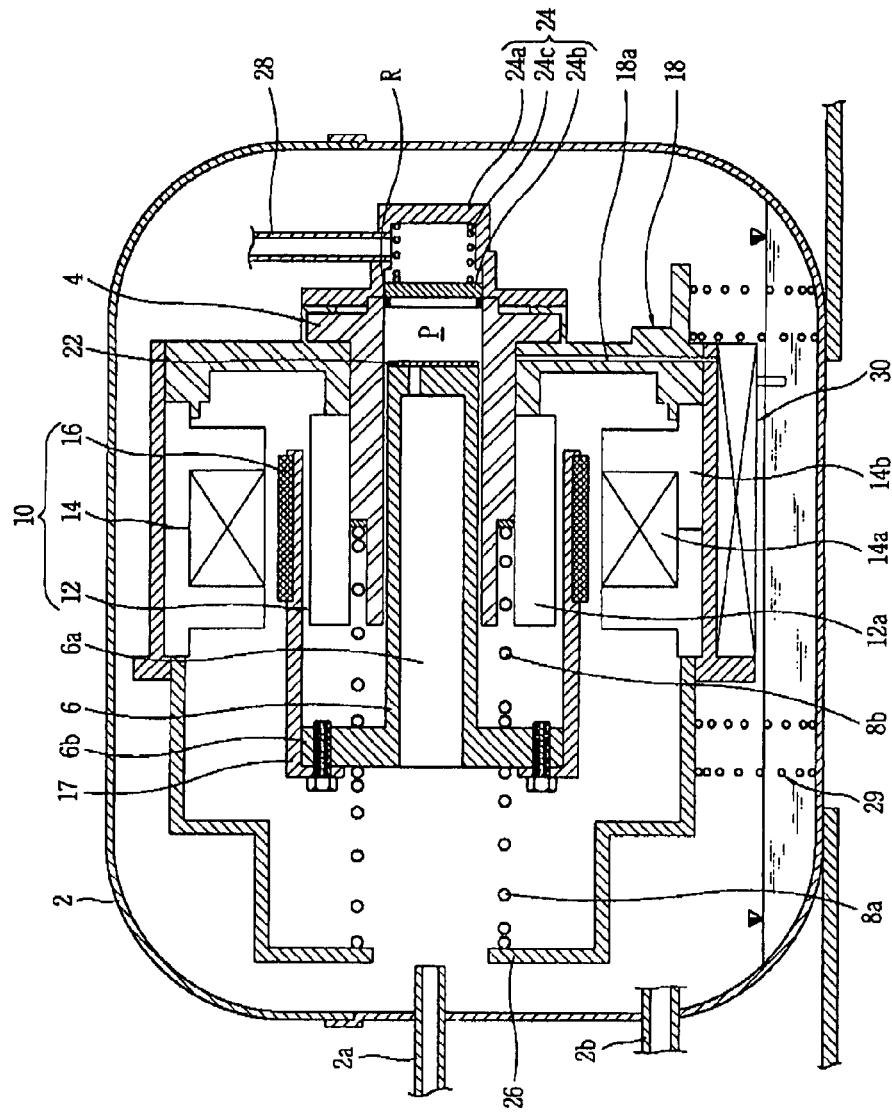
FIG. 3 is a cross-sectional view illustrating a linear compressor in accordance with the present invention.
Figure 4A:
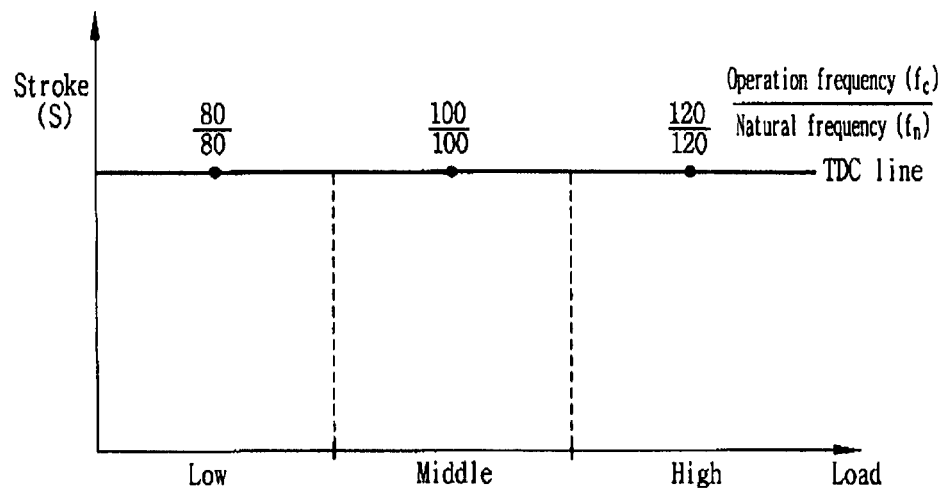
FIG. 4A is a graph showing a stroke by load in the linear compressor in accordance with the present invention.
Figure 4B:
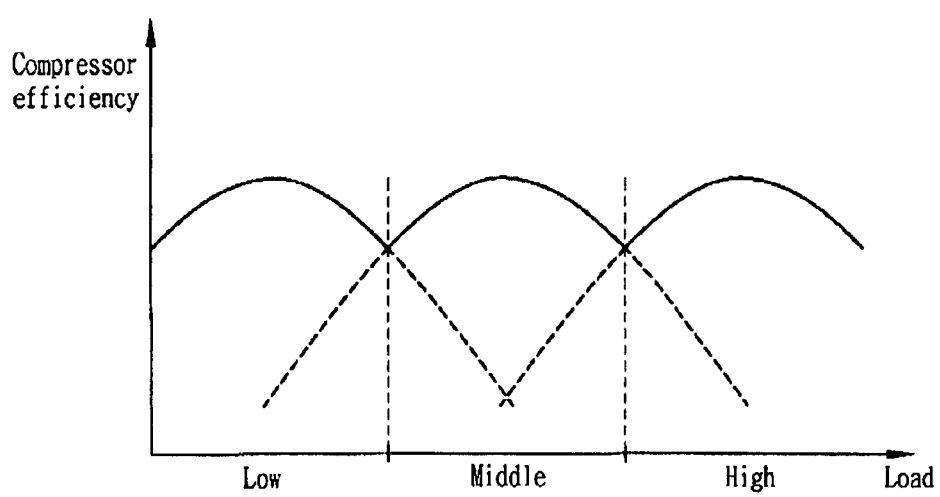
FIG. 4B is a graph showing efficiency by the load in the linear compressor in accordance with the present invention.

As shown in FIG. 3, in the linear compressor, an inlet tube 2a and an outlet tube 2b through which refrigerants are sucked and discharged are installed at one side of a closed vessel 2, a cylinder 4 is fixedly installed inside the closed vessel 2, a piston 6 is installed inside the cylinder 4 to be linearly reciprocated to compress the refrigerants sucked into a compression space P in the cylinder 4, and various springs are installed to be elastically supported in the motion direction of the piston 6. Here, the piston 6 is connected to a linear motor 10 for generating a linear reciprocation driving force. As depicted in FIGS. 4A and 4B, even if a natural frequency $f_n$ of the piston 6 is varied by load, the linear motor 10 controls its operation frequency $f_c$ to be synchronized with the natural frequency $f_n$ of the piston 6, and also controls a stroke S of the piston 6 to vary a compression capacity.

In addition, a suction valve 22 is installed at one end of the piston 6 contacting the compression space P, and a discharge valve assembly 24 is installed at one end of the cylinder 4 contacting the compression space P. The suction valve 22 and the discharge valve assembly 24 are automatically controlled to be opened or closed according to the inside pressure of the compression space P, respectively.

The top and bottom shells of the closed vessel 2 are coupled to hermetically seal the closed vessel 2. The inlet tube 2a through which the refrigerants are sucked and the outlet tube 2b through which the refrigerants are discharged are installed at one side of the closed vessel 2. The piston 6 is installed inside the cylinder 4 to be elastically supported in the motion direction to perform the linear reciprocation. The linear motor 10 is connected to a frame 18 outside the cylinder 4 to compose an assembly. The assembly is installed on the inside bottom surface of the closed vessel 2 to be elastically supported by a support spring 29.

The inside bottom surface of the closed vessel 2 contains oil, an oil supply device 30 for pumping the oil is installed at the lower end of the assembly, and an oil supply tube 18a for supplying the oil between the piston 6 and the cylinder 4 is formed inside the frame 18 at the lower side of the assembly. Accordingly, the oil supply device 30 is operated by vibrations generated by the linear reciprocation of the piston 6, for pumping the oil, and the oil is supplied to the gap between the piston 6 and the cylinder 4 along the oil supply tube 18a, for cooling and lubrication.

The cylinder 4 is formed in a hollow shape so that the piston 6 can perform the linear reciprocation, and has the compression space P at its one side. Preferably, the cylinder 4 is installed on the same straight line with the inlet tube 2a in a state where one end of the cylinder 4 is adjacent to the inside portion of the inlet tube 2a.

The piston 6 is installed inside one end of the cylinder 4 adjacent to the inlet tube 2a to perform linear reciprocation, and the discharge valve assembly 24 is installed at one end of the cylinder 4 in the opposite direction to the inlet tube 2a.

Here, the discharge valve assembly 24 includes a discharge cover 24a for forming a predetermined discharge space at one end of the cylinder 4, a discharge valve 24b for opening or closing one end of the cylinder 4 near the compression space P, and a valve spring 24c which is a kind of coil spring for applying an elastic force between the discharge cover 24a and the discharge valve 24b in the axial direction. An O-ring R is inserted onto the inside circumferential surface of one end of the cylinder 4, so that the discharge valve 24b can be closely adhered to one end of the cylinder 4.

An indented loop pipe 28 is installed between one side of the discharge cover 24a and the outlet tube 2b, for guiding the compressed refrigerants to be externally discharged, and preventing vibrations generated by interactions of the cylinder 4, the piston 6 and the linear motor 10 from being applied to the whole closed vessel 2.

Therefore, when the piston 6 is linearly reciprocated inside the cylinder 4, if the pressure of the compression space P is over a predetermined discharge pressure, the valve spring 24c is compressed to open the discharge valve 24b, and the refrigerants are discharged from the compression space P, and then externally discharged along the loop pipe 28 and the outlet tube 2b.

A refrigerant passage 6a through which the refrigerants supplied from the inlet tube 2a flows is formed at the center of the piston 6. The linear motor 10 is directly connected to one end of the piston 6 adjacent to the inlet tube 2a by a connection member 17, and the suction valve 22 is installed at one end of the piston 6 in the opposite direction to the inlet tube 2a. The piston 6 is elastically supported in the motion direction by various springs.

The suction valve 22 is formed in a thin plate shape. The center of the suction valve 22 is partially cut to open or close the refrigerant passage 6a of the piston 6, and one side of the suction valve 22 is fixed to one end of the piston 6a by screws.

Accordingly, when the piston 6 is linearly reciprocated inside the cylinder 4, if the pressure of the compression space P is below a predetermined suction pressure lower than the discharge pressure, the suction valve 22 is opened so that the refrigerants can be sucked into the compression space P, and if the pressure of the compression space P is over the predetermined suction pressure, the refrigerants of the compression space P are compressed in the close state of the suction valve 22.

Especially, the piston 6 is installed to be elastically supported in the motion direction. In detail, a piston flange 6b protruded in the radial direction from one end of the piston 6 adjacent to the inlet tube 2a is elastically supported in the motion direction of the piston 6 by mechanical springs 8a and 8b such as coil springs. The refrigerants included in the compression space P in the opposite direction to the inlet tube 2a are operated as gas springs due to an elastic force, thereby elastically supporting the piston 6.

Here, the mechanical springs 8a and 8b have constant mechanical spring constants $K_m$ regardless of the load, and are preferably installed side by side with a support frame 26 fixed to the linear motor 10 and the cylinder 4 in the axial direction from the piston flange 6b. Also, preferably, the mechanical spring 8a supported by the support frame 26 and the mechanical spring 8a installed on the cylinder 4 have the same mechanical spring constant $K_m$.

However, the gas spring has a gas spring constant $K_g$ varied by the load. When an ambient temperature rises, the pressure of the refrigerants increases, and thus the elastic force of the gases in the compression space P increases. As a result, the more the load increases, the higher the gas spring constant $K_g$ of the gas spring is.

While the mechanical spring constant $K_m$ is constant, the gas spring constant $K_g$ is varied by the load. Therefore, the total spring constant is also varied by the load, and the natural frequency $f_n$ of the piston 6 is varied by the gas spring constant $K_g$ in the above Formula 1.

Even if the load is varied, the mechanical spring constant $K_m$ and the mass M of the piston 6 are constant, but the gas spring constant $K_g$ is varied. Thus, the natural frequency $f_n$ of the piston 6 is remarkably influenced by the gas spring constant $K_g$ varied by the load. In the case that the algorithm for varying the natural frequency $f_n$ of the piston 6 by the load is obtained and the operation frequency $f_c$ of the linear motor 10 is synchronized with the natural frequency $f_n$ of the piston 6, efficiency of the linear compressor can be improved and the load can be rapidly overcome.

The load can be measured in various ways. Since the linear compressor is installed in a refrigeration/air conditioning cycle for compressing, condensing, evaporating and expanding refrigerants, the load can be defined as a difference between a condensing pressure which is a pressure of condensing refrigerants and an evaporating pressure which is a pressure of evaporating refrigerants. In order to improve accuracy, the load is determined in consideration of an average pressure of the condensing pressure and the evaporating pressure.

That is, the load is calculated in proportion to the difference between the condensing pressure and the evaporating pressure and the average pressure. The more the load increases, the higher the gas spring constant $K_g$ is. For example, if the difference between the condensing pressure and the evaporating pressure increases, the load increases. Even though the difference between the condensing pressure and the evaporating pressure is not changed, if the average pressure increases, the load increases. The gas spring constant $K_g$ increases according to the load.

Figure 5:
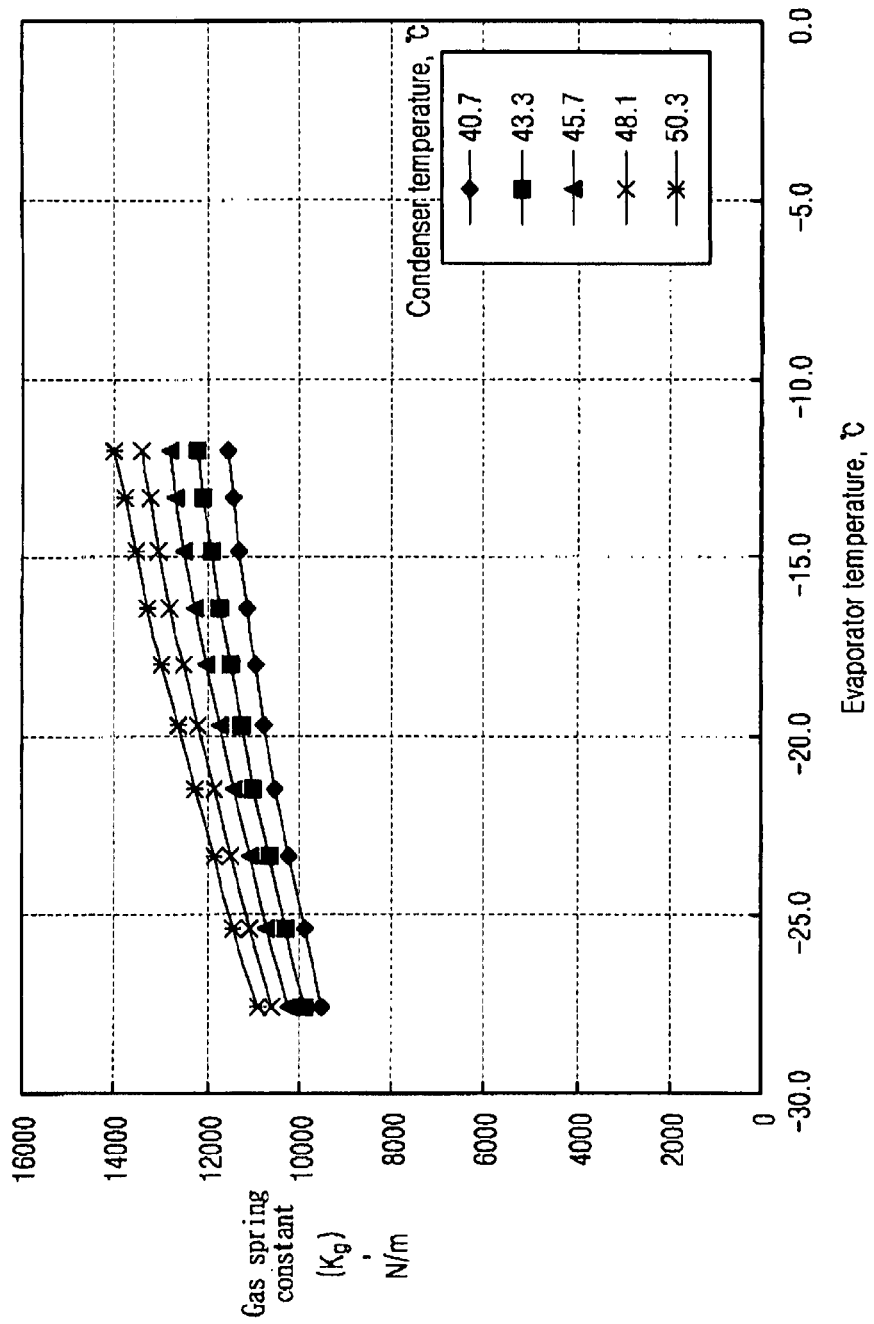
FIG. 5 is a graph showing changes of a gas spring constant by the load in the linear compressor in accordance with the present invention.

As illustrated in FIG. 5, a condensing temperature proportional to the condensing pressure and an evaporating temperature proportional to the evaporating pressure are measured, and the load is calculated in proportion to a difference between the condensing temperature and the evaporating temperature and an average temperature. Such data are employed to estimate the natural frequency $f_n$ of the piston 6 by a predetermined frequency estimation algorithm.

In detail, the mechanical spring constant $K_m$ and the gas spring constant $K_g$ can be determined by various experiments. In accordance with the present invention, the mechanical springs 8a and 8b of the linear compressor have a smaller mechanical spring constant $K_m$ than the mechanical springs of the conventional linear compressor, which increases the ratio of the gas spring constant $K_g$ to the total spring constant $K_T$. Therefore, a resonance frequency of the piston 6 is varied by the load within a relatively large range, and the operation frequency $f_c$ of the linear motor 10 is easily synchronized with the natural frequency $f_n$ of the piston 6 varied by the load.

Figure 6:
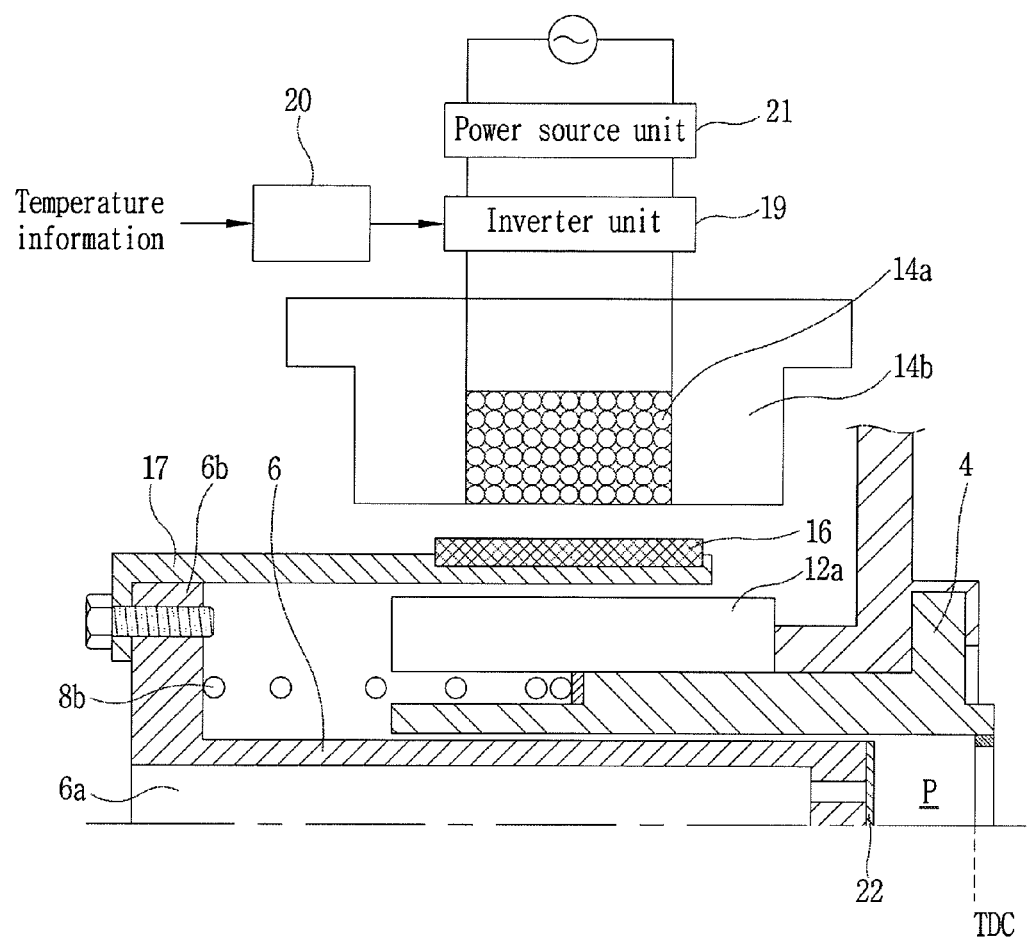
FIG. 6 is a structure view illustrating a linear motor of FIG. 3.

Referring to FIG. 6, the linear motor 10 includes an inner stator 12 formed by stacking a plurality of laminations 12a in the circumferential direction, and fixedly installed outside the cylinder 4 by the frame 18, an outer stator 14 formed by stacking a plurality of laminations 14b at the periphery of a coil wound body 14a in the circumferential direction, and installed outside the cylinder 4 by the frame 18 with a predetermined gap from the inner stator 12, and a permanent magnet 16 positioned at the gap between the inner stator 12 and the outer stator 14, and connected to the piston 6 by the connection member 17. Here, the coil wound body 14a can be fixedly installed outside the inner stator 12.

Especially, the linear motor 10 is connected to the piston 6, for linearly reciprocating the piston 6 in the axial direction, and varying the stroke S of the piston 6 according to a predetermined load (or refrigeration force), so that the piston 6 can be linearly reciprocated to reach a top dead center (TDC). For this, the linear motor 10 includes a power source unit 21 for applying a direct current voltage by rectifying an external alternating current voltage, an inverter unit 19 for receiving the rectified direct current voltage from the power source unit 21, generating a sine wave alternating current voltage according to a predetermined inverter control signal (for example, PWM signal), and applying the sine wave alternating current voltage to the coil wound body 14a, and a control unit 20 for setting a variable quantity of the stroke S of the piston 6 according to the load, generating the inverter control signal for generating the unsymmetrical alternating current voltage according to the variable quantity, and applying the inverter control signal to the inverter unit 19.

Here, the power source unit 21 is a general rectification circuit, and the inverter unit 19 is a general inverter device.

Here, the power unit 18 is a general rectification circuit, and the inverter unit 19 is a general inverter device.

As described above, the control unit 20 generates the inverter control signal for generating the sine wave alternating current voltage unsymmetrical from a null point in order to receive temperature information and vary the stroke S of the piston 6 according to the load (or refrigeration force) corresponding to the temperature information.

The control unit 20 linearly reciprocates the piston 6 inside the cylinder 4 to form the compression space P. Even if the stroke S of the piston 6 is varied, the control unit 20 linearly reciprocates the piston 6 to reach the TDC in which the piston 6 is completely compressed in the cylinder 4 not to form the compression space P. Because the piston 6 is linearly reciprocated to the TDC, compression efficiency is maintained regardless of variations of the stroke S of the piston 6.

The operations and functions of the control unit 20 will now be explained with reference to FIGS. 7A to 7D. Here, the control unit 20 performs a process for setting the unsymmetrical alternating current voltage (a kind of voltage command value), operating the natural frequency $f_n$ by the load according to a predetermined frequency estimation algorithm using the data of FIG. 5, and equalizing the frequency of the unsymmetrical alternating current voltage (namely, operation frequency $f_c$) with the natural frequency $f_n$, which will not be explained below.

Figure 1A:
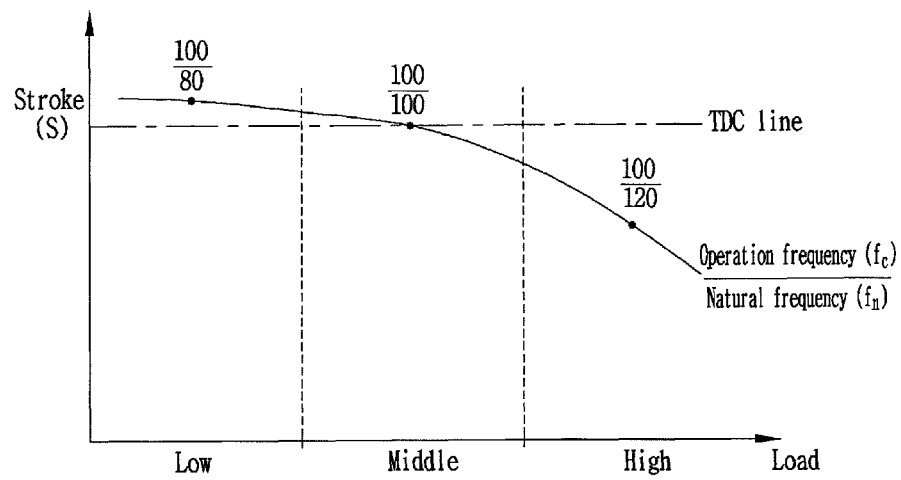
FIG. 1A is a graph showing a stroke by load in a conventional linear compressor.
Figure 1B:
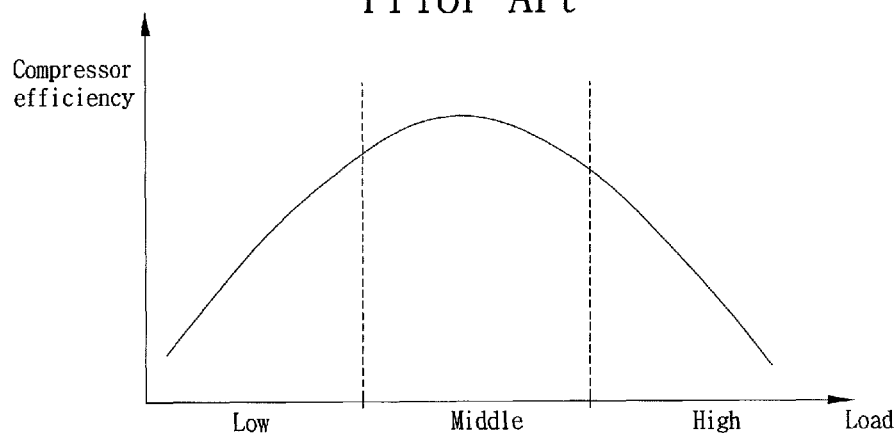
FIG. 1B is a graph showing efficiency by the load in the conventional linear compressor.
Figure 2A:
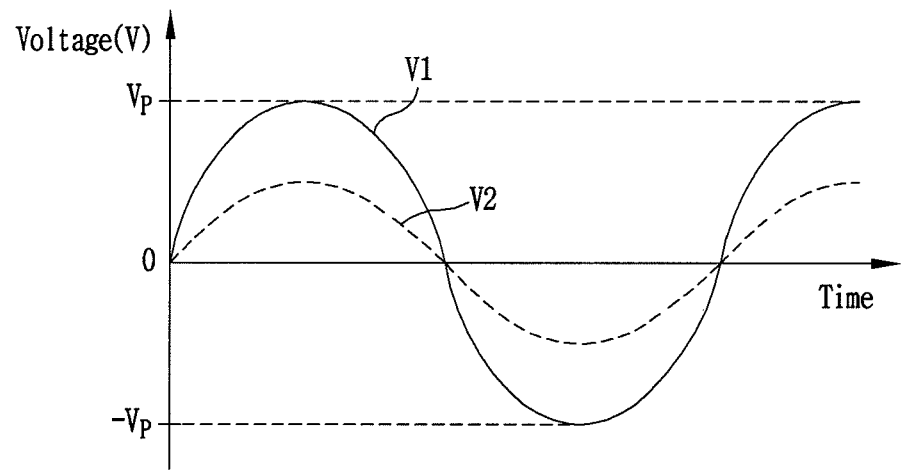
FIGS. 2A and 2B are structure views illustrating the stroke in each operation mode of the conventional linear compressor.
Figure 2B:
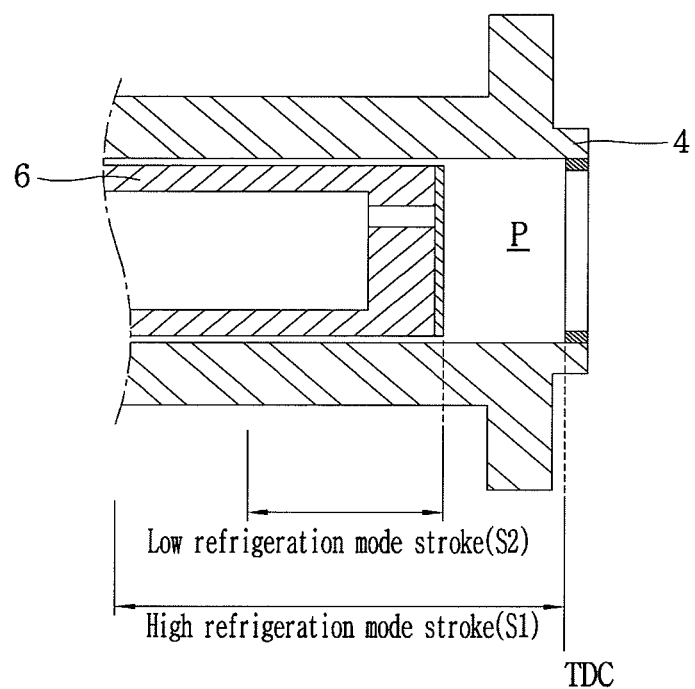
Figure 7A:
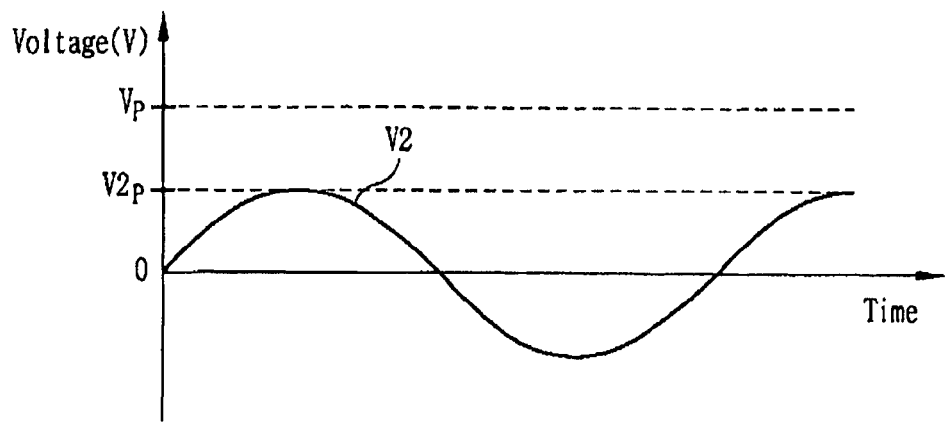
FIGS. 7A to 7D are graphs showing a first example for setting a sine wave driving voltage in the linear motor of FIG. 6.

First, a voltage V2 of FIG. 7A is identical to the voltage V2 of FIG. 2A. That is, a peak-peak value of the voltage V2 decreases in order to reduce the stroke S of the piston 6 according to the load (small load). However, a peak value $V2_p$ of the voltage V2 is smaller than a maximum voltage threshold value $V_p$, so that the piston 6 cannot reach the TDC.

Figure 7B:
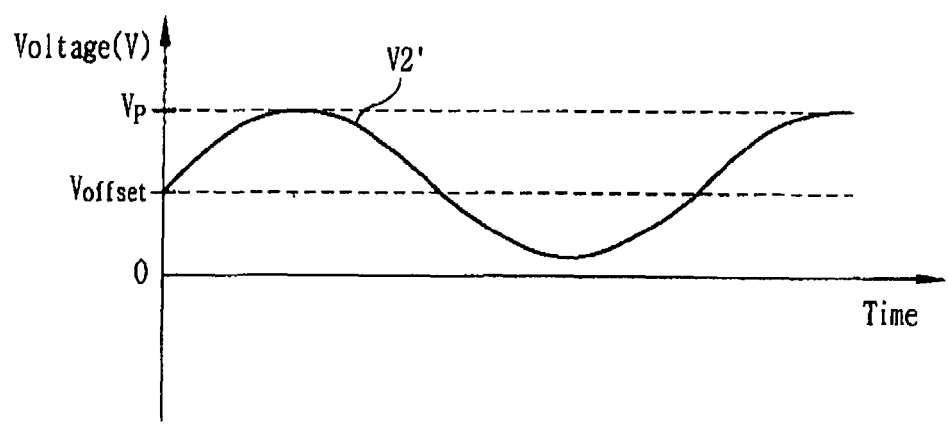

Therefore, as shown in FIG. 7B, the control unit 20 sets a new voltage V2' by adding a predetermined offset voltage $V_{offset}$ to the voltage V2. Here, a size of the offset voltage $V_{offset}$ is $(V_p-V2_p)$. In addition, the offset voltage $V_{offset}$ is a direct current voltage having a positive value.

As mentioned above, the control unit 20 sets the (sine wave) voltage having the peak-peak value for reducing the stroke S of the piston 6 according to the load (1), and sets the sine wave alternating current voltage unsymmetrical from the null point and symmetrical to the offset voltage $V_{offset}$, by calculating and adding the offset voltage $V_{offset}$ so that the positive peak value of the set voltage can be equalized to the maximum voltage threshold value $V_p$ (2). When the control unit 20 generates the inverter control signal corresponding to the set unsymmetrical alternating current voltage and transmits the generated signal to the inverter unit 19, the inverter unit 19 generates the set unsymmetrical alternating current voltage according to the inverter control signal and applies the generated voltage to the coil wound body 14a, thereby linearly reciprocating the piston 6. The control unit 20 can set the unsymmetrical alternating current voltage by performing step (2) before step (1). In this case, the size of the offset voltage $V_{offset}$ and the decrease width of the peak-peak value are appropriately set, which can be easily embodied by those skilled in the art to which the present invention pertains.

In more detail, when the unsymmetrical alternating current voltage V2' is higher than the offset voltage $V_{offset}$, the control unit 20 makes the piston 6 perform compression, and when the unsymmetrical alternating current voltage V2' is lower than the offset voltage $V_{offset}$, the control unit 20 makes the piston 6 perform suction.

Figure 7C:
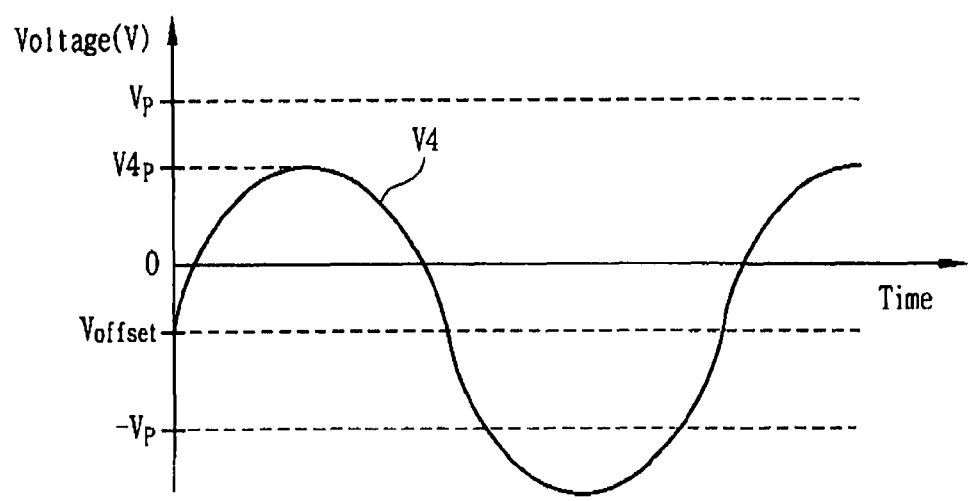

FIG. 7C shows a voltage V4 obtained by adding a predetermined size of offset voltage $V_{offset}$ to the voltage V1 of FIG. 2A. Here, the offset voltage $V_{offset}$ is a direct current voltage having a negative value.

Figure 7D:
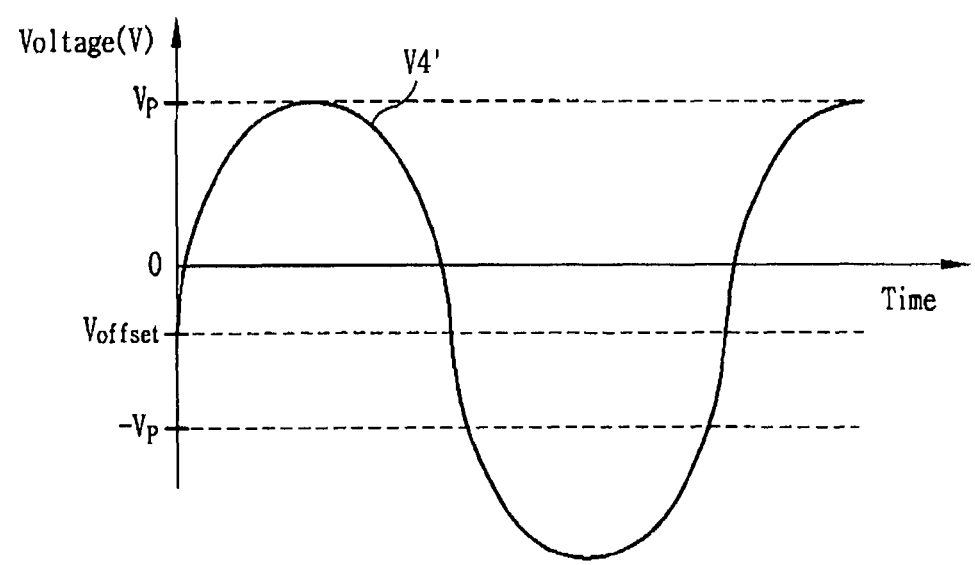

Since a peak value $V4_p$ of the voltage V4 is smaller than the maximum voltage threshold value $V_p$, as shown in FIG. 7D, a peak-peak value of the voltage V4 is increased so that a peak value of a voltage V4' can be equalized to the maximum voltage threshold value $V_p$. The unsymmetrical alternating current voltage is set to increase the stroke S of the piston 6 in large load (or high refrigeration force). Here, the new voltage V4' is also a sine wave alternating current voltage unsymmetrical from the null point and symmetrical to the offset voltage $V_{offset}$.

Accordingly, when the control unit 20 generates the inverter control signal corresponding to the set unsymmetrical alternating current voltage and transmits the generated signal to the inverter unit 19, the inverter unit 19 generates the set unsymmetrical alternating current voltage according to the inverter control signal and applies the generated voltage to the coil wound body 14*a*, thereby linearly reciprocating the piston 6.

The method for increasing the stroke S of the piston 6 in FIGS. 7C and 7D can also be embodied by increasing the peak-peak value of the voltage, and adding the offset voltage $V_{offset}$ which is the negative direct current voltage, so that the peak value of the voltage can be equalized to the maximum voltage threshold value $V_p$.

In addition, when the unsymmetrical alternating current voltage V2' is higher than the offset voltage $V_{offset}$, the control unit 20 makes the piston 6 perform compression, and when the unsymmetrical alternating current voltage V2' is lower than the offset voltage $V_{offset}$, the control unit 20 makes the piston 6 perform suction.

Figure 8A:
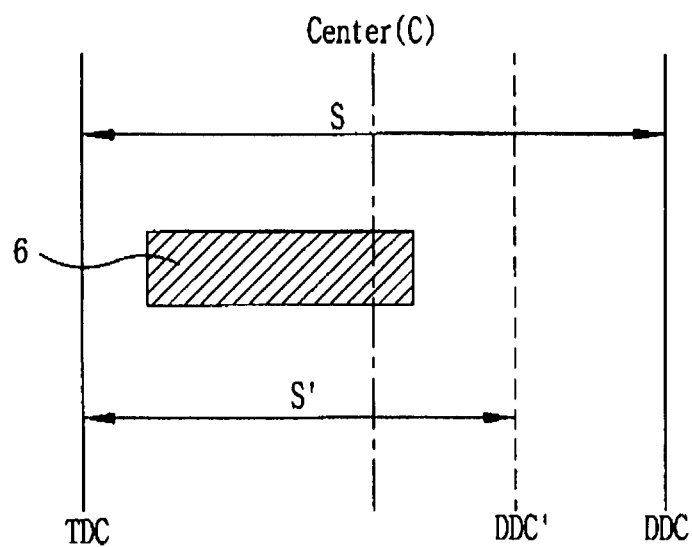
FIGS. 8A and 8B are state views illustrating variations of a stroke of a piston.
Figure 8B:
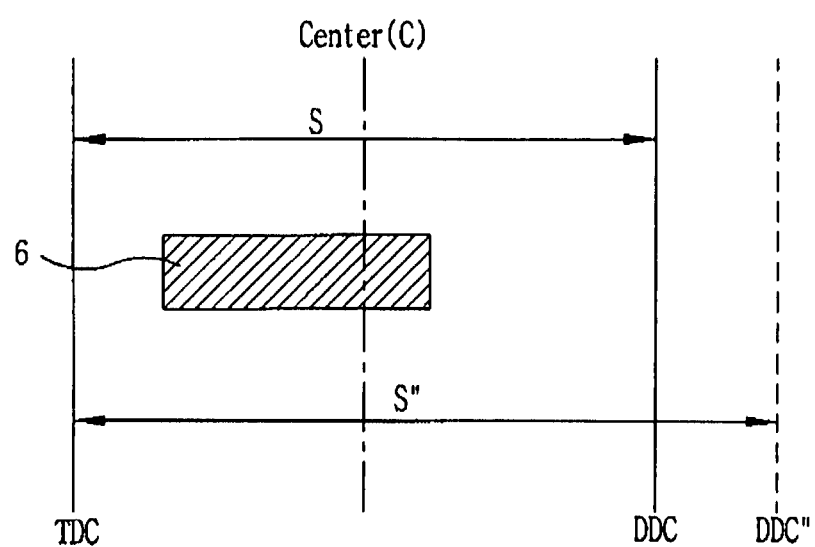

FIGS. 8A and 8B are state views illustrating variations of the stroke S of the piston 6.

FIG. 8A shows a stroke S' of the piston 6 when the control unit 20 generates the inverter control signal for the set unsymmetrical alternating current voltage as shown in FIG. 7B and transmits the inverter control signal to the inverter unit 19, and when the inverter unit 19 applies the set unsymmetrical alternating current voltage to the coil wound body 14*a* to linearly reciprocate the piston 6. The stroke S is a movement distance of the piston 6 until the piston 6 reaches the TDC. Here, when the alternating current voltage (voltage V1 of FIG. 2A) symmetrical to the null point is generated and applied, a compression distance and a suction distance are identical from a predetermined center C.

Referring to FIG. 8A, the stroke S' of the piston 6 by the unsymmetrical alternating current voltage is shorter than the stroke S of the piston 6 by the symmetrical alternating current voltage. The piston 6 is linearly reciprocated to reach the TDC. Here, the piston 6 is linearly reciprocated to reach a new DDC' (down dead center) by the decreased stroke S', not a previous DDC.

Conversely, FIG. 8B shows a stroke S" of the piston 6 when the control unit 20 generates the inverter control signal for the set unsymmetrical alternating current voltage as shown in FIG. 7D and transmits the inverter control signal to the inverter unit 19, and when the inverter unit 19 applies the set unsymmetrical alternating current voltage to the coil wound body 14*a* to linearly reciprocate the piston 6. The stroke S is a movement distance of the piston 6 until the piston 6 reaches the TDC. Here, when the alternating current voltage (voltage V1 of FIG. 2A) symmetrical to the null point is generated and applied, a compression distance and a suction distance are identical from a predetermined center C.

As illustrated in FIG. 8B, the stroke S" of the piston 6 by the unsymmetrical alternating current voltage is longer than the stroke S of the piston 6 by the symmetrical alternating current voltage. Differently from the conventional arts, the piston 6 is linearly reciprocated to reach the TDC. Here, the piston 6 is linearly reciprocated to reach a new DDC" by the increased stroke S", not a previous DDC.

Figure 9:
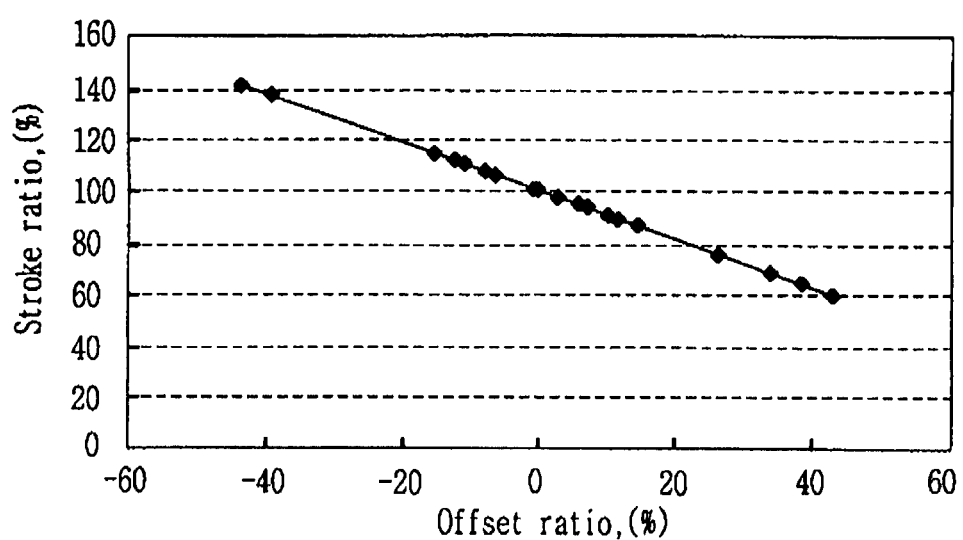
FIG. 9 is a graph showing results of the first example of FIG. 6.

FIG. 9 is a graph showing results of the first example of FIG. 6. X axis denotes an offset ratio and Y axis denotes a stroke ratio. Here, the offset ratio is defined as (pushed distance of the piston 6 by the offset voltage)/(structural initial value). In detail, the pushed distance of the piston 6 by the offset voltage $V_{offset}$ is a movement distance of the piston 6 toward the TDC by the added offset voltage $V_{offset}$, which is identical to the movement distance of the center of the stroke in FIGS. 8A and 8B. That is, it implies a difference between the center C of the stroke S and the centers of the strokes S' and S" in the symmetrical alternating current voltage. In addition, the structural initial value implies a fixed interval between the TDC and the center C in a voltage non-application state. Therefore, if the offset ratio has a positive value, when the load is the low refrigeration, the piston 6 is pushed toward the TDC, and if the offset ratio has a negative value, when the load is the high refrigeration, the piston 6 is pushed toward the DDC. The stroke ratio is defined as (stroke when the offset voltage is added)/(stroke by the symmetrical alternating current voltage).

Accordingly, in the relations between the offset ratio and the stroke ratio, when the piston 6 is pushed toward the TDC by the offset voltage, namely, when the offset value has a positive value, the whole stroke decreases, and thus the stroke ratio is lower than 100%, and when the offset value has a negative value, the whole stroke increases, and thus the stroke ratio is higher than 100%. On the basis of the relations, the stroke can be varied by the unsymmetrical alternating current voltage, and the refrigeration force can also be varied. As a result, the linear compressor can rapidly handle variable load by changing the refrigeration force.

Figure 10A:
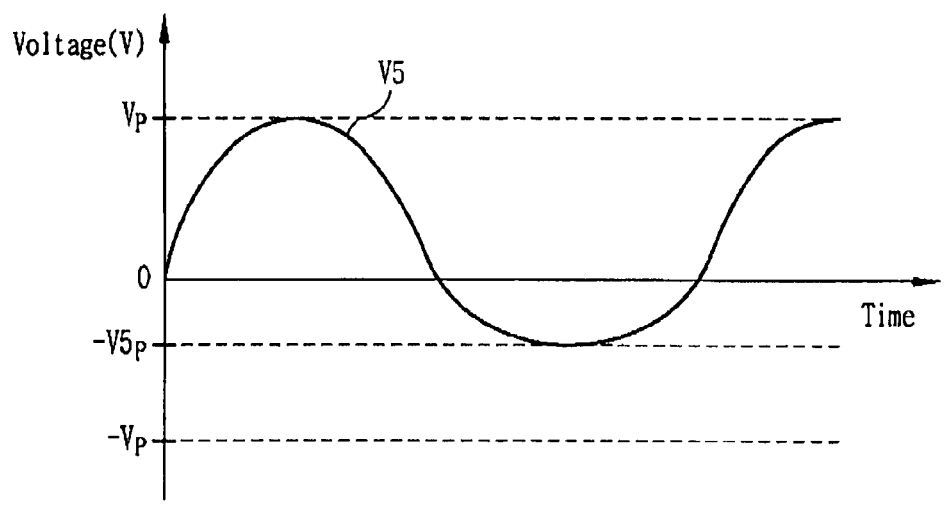
FIGS. 10A and 10B are graphs showing a second example for setting a sine wave driving voltage in the linear motor of FIG. 6.
Figure 10B:
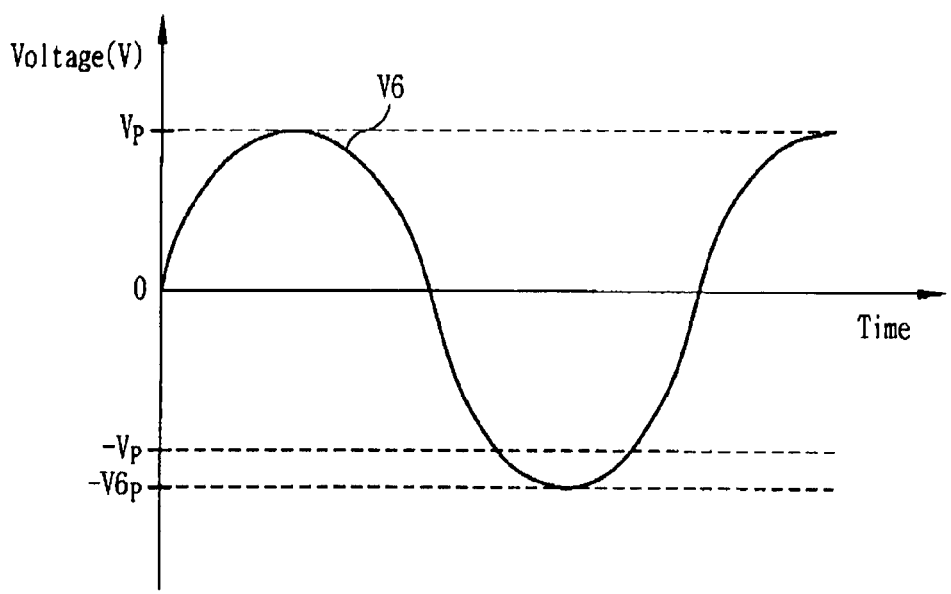

FIGS. 10A and 10B are graphs showing a second example for setting a sine wave driving voltage in the linear motor of FIG. 6.

Identically to the first example, the piston 6 must reach the TDC, and thus positive peak values of voltages V5 and V6 must be equalized to the maximum voltage threshold value $V_p$. A positive area (compression) of the voltage V2 of FIG. 2A is maintained identically, but a negative area (suction) of the voltage V2 is changed to vary the stroke of the piston 6.

As depicted in FIG. 10A, the control unit 20 sets a peak value $V5_p$ in the negative area of the load voltage V2 smaller than the maximum voltage threshold value $V_p$ according to the load (small load). For this, the control unit 20 decreases the negative area of the voltage V2 by a predetermined ratio corresponding to the load (namely, as much as the variable quantity of the stroke), or decreases the negative area according to the load (namely, as much as the variable quantity of the stroke) by adding a predetermined alternating current voltage. Since a peak-peak value of the voltage V5 is smaller than that of the voltage V2, the stroke of the piston 6 decreases, which brings the same result as that of FIG. 8A.

As shown in FIG. 10B, the control unit 20 sets a peak value $V6_p$ in the negative area of the load voltage V2 larger than the maximum voltage threshold value $V_p$. For this, the control unit 20 increases the negative area of the voltage V2 by a predetermined ratio corresponding to the load (namely, as much as the variable quantity of the stroke), or increases the negative area according to the load (namely, as much as the variable quantity of the stroke) by adding a predetermined alternating current voltage. Since a peak-peak value of the voltage V6 is larger than that of the voltage V2, the stroke of the piston 6 increases, which brings the same result as that of FIG. 8B.

In FIGS. 10A and 10B, the control unit 20 performs a process for setting the unsymmetrical alternating current voltage, operating the natural frequency $f_n$ by the load, and equalizing the frequency of the unsymmetrical alternating current voltage (namely, operation frequency $f_c$) with the natural frequency $f_n$, which will not be explained below.

The variations of the stroke of the piston 6 by the unsymmetrical alternating current voltage as shown in FIGS. 10A and 10B correspond to those of FIGS. 8A and 8B, respectively, which will not be explained below.

Figure 11:
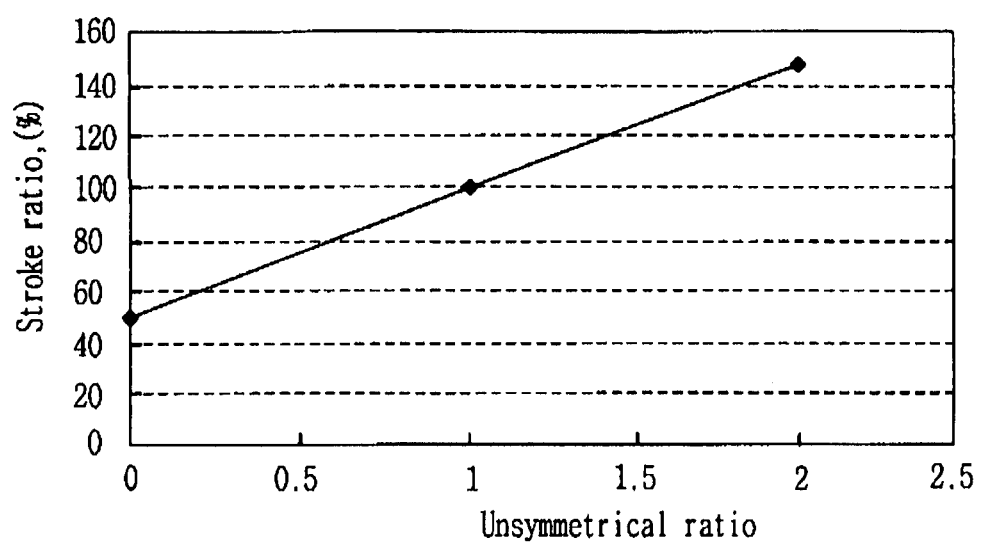
FIG. 11 is a graph showing results of the second example of FIG. 6.

FIG. 11 is a graph showing results of the second example of FIG. 6. X axis denotes a unsymmetrical ratio and Y axis denotes a stroke ratio. Here, the unsymmetrical ratio is defined as (amplitude of the stroke in suction)/(amplitude of the stroke in compression), and the stroke ratio is defined as (stroke when the unsymmetrical alternating current voltage is applied)/(stroke when the symmetrical alternating current voltage is applied).

In detail, in the case of the unsymmetrical alternating current voltage having the negative peak value smaller than the positive peak value as shown in FIG. 10A, the unsymmetrical ratio is smaller than '1', and the whole stroke decreases. Conversely, in the case of the unsymmetrical alternating current voltage having the negative peak value larger than the positive peak value as shown in FIG. 10B, the unsymmetrical ratio is larger than '1', and the whole stroke increases. On the basis of the relations, the stroke can be varied by the unsymmetrical alternating current voltage, and the refrigeration force can also be varied. As a result, the linear compressor can rapidly handle variable load by changing the refrigeration force.

As the load increases, the gas spring constant $K_g$ and the natural frequency $f_n$ of the piston 6 increase at the same time. The frequency of the unsymmetrical alternating current voltage is controlled so that the operation frequency $f_c$ of the linear motor 10 can be synchronized with the natural frequency $f_n$ of the piston 6 by the frequency estimation algorithm. Therefore, the linear compressor is operated in the resonance state, to improve compression efficiency.

On the other hand, as the load increases, the gas spring constant $K_g$ and the natural frequency $f_n$ of the piston 6 decrease at the same time. The frequency of the unsymmetrical alternating current voltage is controlled so that the operation frequency $f_c$ of the linear motor 10 can be synchronized with the natural frequency $f_n$ of the piston 6 by the frequency estimation algorithm. Accordingly, the linear compressor is operated in the resonance state, to improve compression efficiency.

As discussed earlier, in accordance with the present invention, the linear compressor is operated in the resonance state by estimating variations of the gas spring constant and the natural frequency by the load through the frequency estimation algorithm, and synchronizing the operation frequency of the linear motor (namely, frequency of the unsymmetrical alternating current voltage) with the natural frequency, thereby maximizing compression efficiency.

The linear compressor in which the moving magnet type linear motor is operated and the piston connected to the linear motor is linearly reciprocated inside the cylinder to suck, compress and discharge the refrigerants has been explained in detail on the basis of the preferred embodiments and accompanying drawings. However, although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. An apparatus for controlling a linear compressor, comprising:
    a power source unit for applying a direct current voltage by rectifying an external alternating current voltage;
    an inverter unit for receiving the direct current voltage from the power source unit, generating an alternating current voltage according to an inverter control signal, and applying the alternating current voltage to a coil wound body; and
    a control unit for setting a current voltage having a peak-peak value according to a refrigeration force and having a positive peak value equalized to a positive peak value of a maximum voltage threshold value of the inverter,
    wherein the control unit generates the inverter control signal used for generating the set current voltage, and applies the inverter control signal to the inverter unit,
    wherein the control unit varies a negative peak value of the set current voltage according to the load when the positive peak value of the set current voltage is maintained identically,
    wherein, when the refrigeration force is high, the peak-peak value of the varied set current voltage is larger than a peak-peak value according to the maximum voltage threshold value of the inverter unit, and
    wherein, when the refrigeration force is low, the peak-peak value of the varied set current voltage is smaller than the peak-peak value according to the maximum voltage threshold value of the inverter unit.

2. The apparatus of claim 1, wherein, when a value of the varied set current voltage is positive, a movable member of the compressor performs compression, and, when a value of the varied set current voltage is negative, the movable member performs suction.

3. The apparatus of claim 1, wherein the negative peak value of the set current voltage is varied by a predetermined ratio corresponding to the load.

4. The apparatus of claim 1, wherein the negative peak value of the set current voltage is varied by adding a predetermined alternating current voltage.

* * * * *